(12) United States Patent
Abramowitz

(10) Patent No.: US 9,352,685 B1
(45) Date of Patent: May 31, 2016

(54) ILLUMINATED LICENSE PLATE FRAME

(71) Applicant: Mel Abramowitz, Margate, FL (US)

(72) Inventor: Mel Abramowitz, Margate, FL (US)

( * ) Notice: Subject to any disclaimer, the term of this patent is extended or adjusted under 35 U.S.C. 154(b) by 0 days.

(21) Appl. No.: 14/988,870

(22) Filed: Jan. 6, 2016

(51) Int. Cl.
*B60Q 1/56* (2006.01)
*B60R 13/10* (2006.01)

(52) U.S. Cl.
CPC ............... *B60Q 1/56* (2013.01); *B60R 13/105* (2013.01)

(58) Field of Classification Search
CPC ............................... B60Q 1/56; B60R 13/105
See application file for complete search history.

(56) References Cited

U.S. PATENT DOCUMENTS

| | | | |
|---|---|---|---|
| 4,857,890 A * | 8/1989 | Solow | B60Q 1/56 340/479 |
| 5,029,053 A | 7/1991 | Solow | |
| 5,408,772 A * | 4/1995 | Pettyjohn | G09F 27/00 40/200 |
| 5,692,327 A | 12/1997 | Wynne | |
| 6,027,235 A * | 2/2000 | Chen | B60Q 1/56 362/497 |
| 6,478,458 B2 | 11/2002 | Hickman | |
| 6,526,680 B1 * | 3/2003 | Yu | B60R 13/10 362/497 |
| 6,874,922 B2 * | 4/2005 | Matsuura | B60Q 1/56 362/497 |
| 7,210,830 B1 * | 5/2007 | Mayo | B60Q 1/38 362/497 |
| 7,430,822 B1 | 10/2008 | Combs | |
| 8,466,620 B2 | 6/2013 | Kwon | |
| 2003/0142044 A1 * | 7/2003 | Berry | B60Q 1/503 345/55 |
| 2008/0120875 A1 * | 5/2008 | Yen | B60R 13/105 40/204 |
| 2009/0077843 A1 | 3/2009 | Dayan | |
| 2011/0289806 A1 * | 12/2011 | Kuo | B60R 13/105 40/204 |

* cited by examiner

*Primary Examiner* — Gary Hoge
(74) *Attorney, Agent, or Firm* — Kyle A. Fletcher, Esq.

(57) ABSTRACT

The illuminated license plate frame is a frame adapted to receive a license plate and to mount the license plate on vehicles. The illuminated license plate frame further comprises a safety device formed from a first LED string and a second LED string. The first LED string is wired to illuminate when the left turn signal or the brake light is illuminated. The second LED string is wired to illuminate when the right turn signal or the brake light is illuminated. The illuminated license plate frame comprises a frame, a first LED string, a second LED string, a plurality of protective covers, and an electric circuit.

20 Claims, 5 Drawing Sheets

ILLUMINATED LICENSE PLATE FRAME

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of exhibition of cards, placards, and signs, more specifically, an illuminated license plate frame.

SUMMARY OF INVENTION

The illuminated license plate frame is a frame adapted to receive a license plate and to mount the license plate on vehicles. The illuminated license plate frame further comprises a safety device formed from a first LED string and a second LED string. The first LED string is wired to illuminate when the left turn signal or the brake light is illuminated. The second LED string is wired to illuminate when the right turn signal or the brake light is illuminated.

These together with additional objects, features and advantages of the illuminated license plate frame will be readily apparent to those of ordinary skill in the art upon reading the following detailed description of the presently preferred, but nonetheless illustrative, embodiments when taken in conjunction with the accompanying drawings.

In this respect, before explaining the current embodiments of the illuminated license plate frame in detail, it is to be understood that the illuminated license plate frame is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the illuminated license plate frame.

It is therefore important that the claims be regarded as including such equivalent construction insofar as they do not depart from the spirit and scope of the illuminated license plate frame. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
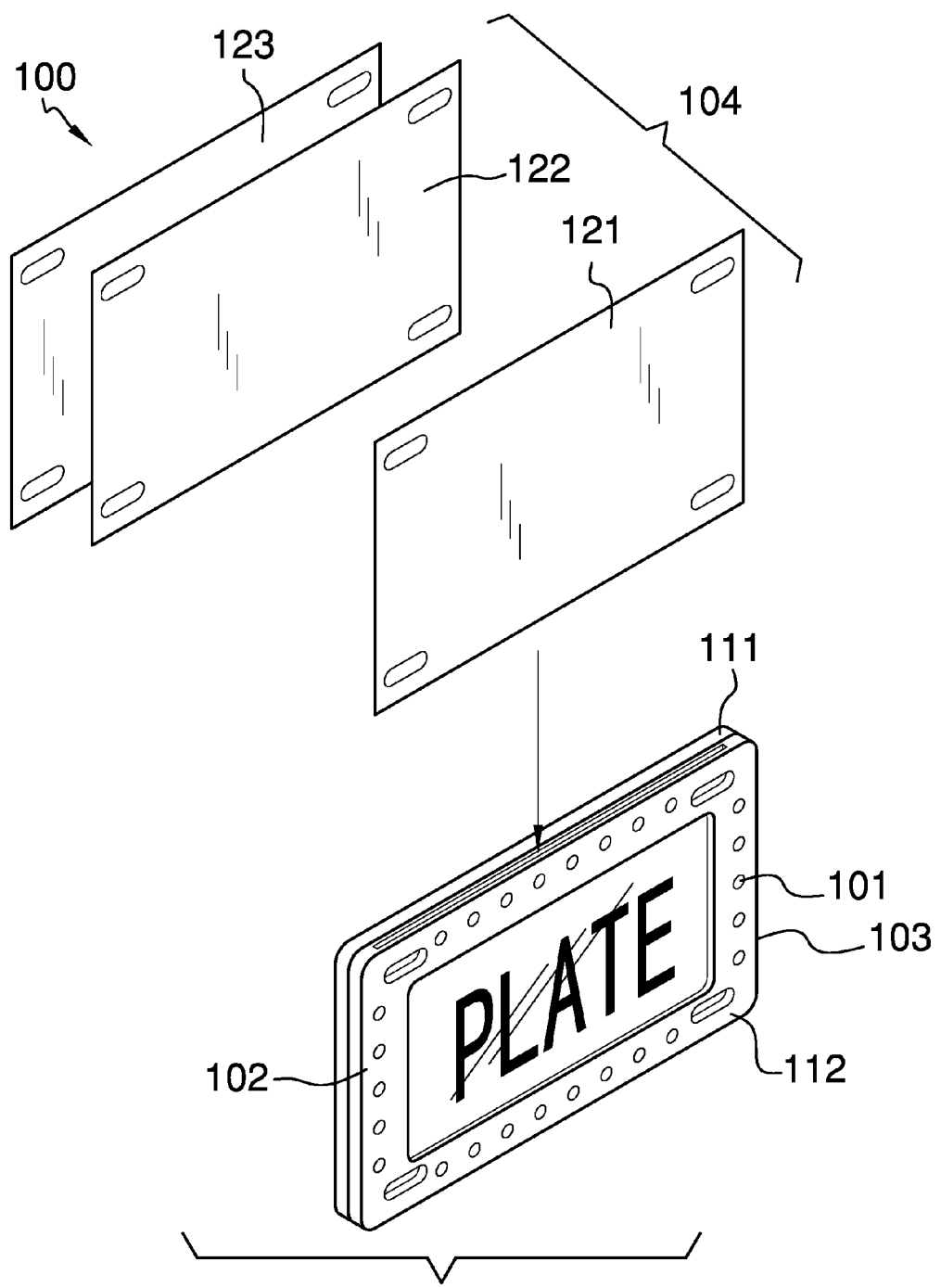
FIG. 1 is a perspective view of an embodiment of the disclosure.
Figure 2:
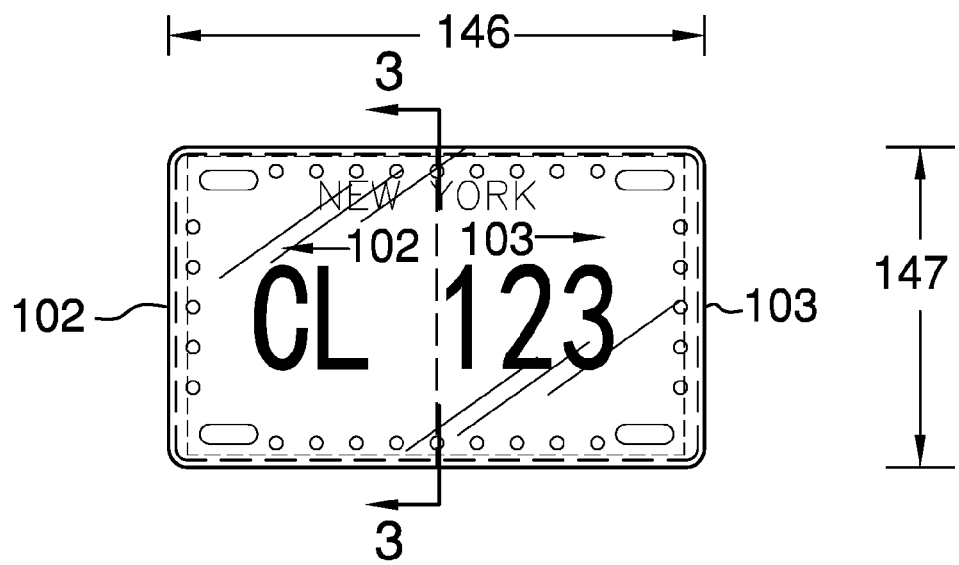
FIG. 2 is a front view of an embodiment of the disclosure.
Figure 3:
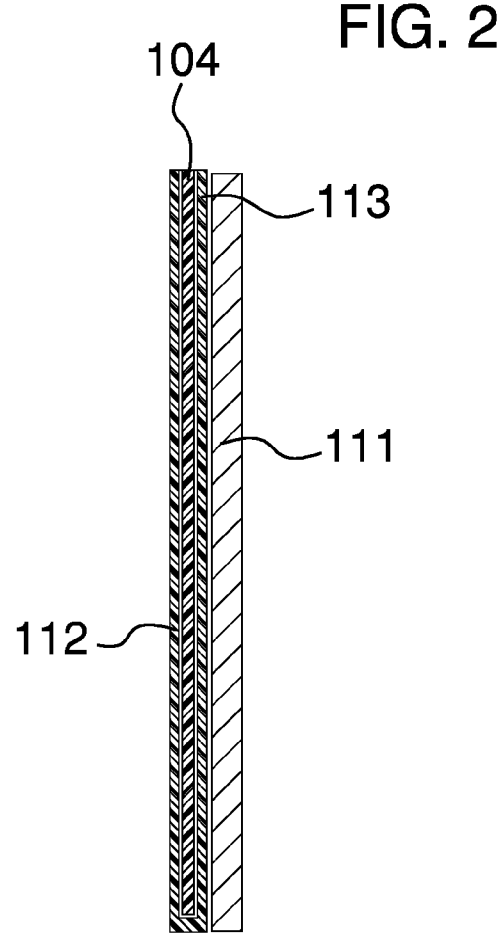
FIG. 3 is a cross-sectional view of an embodiment of the disclosure across 3-3.
Figure 4:
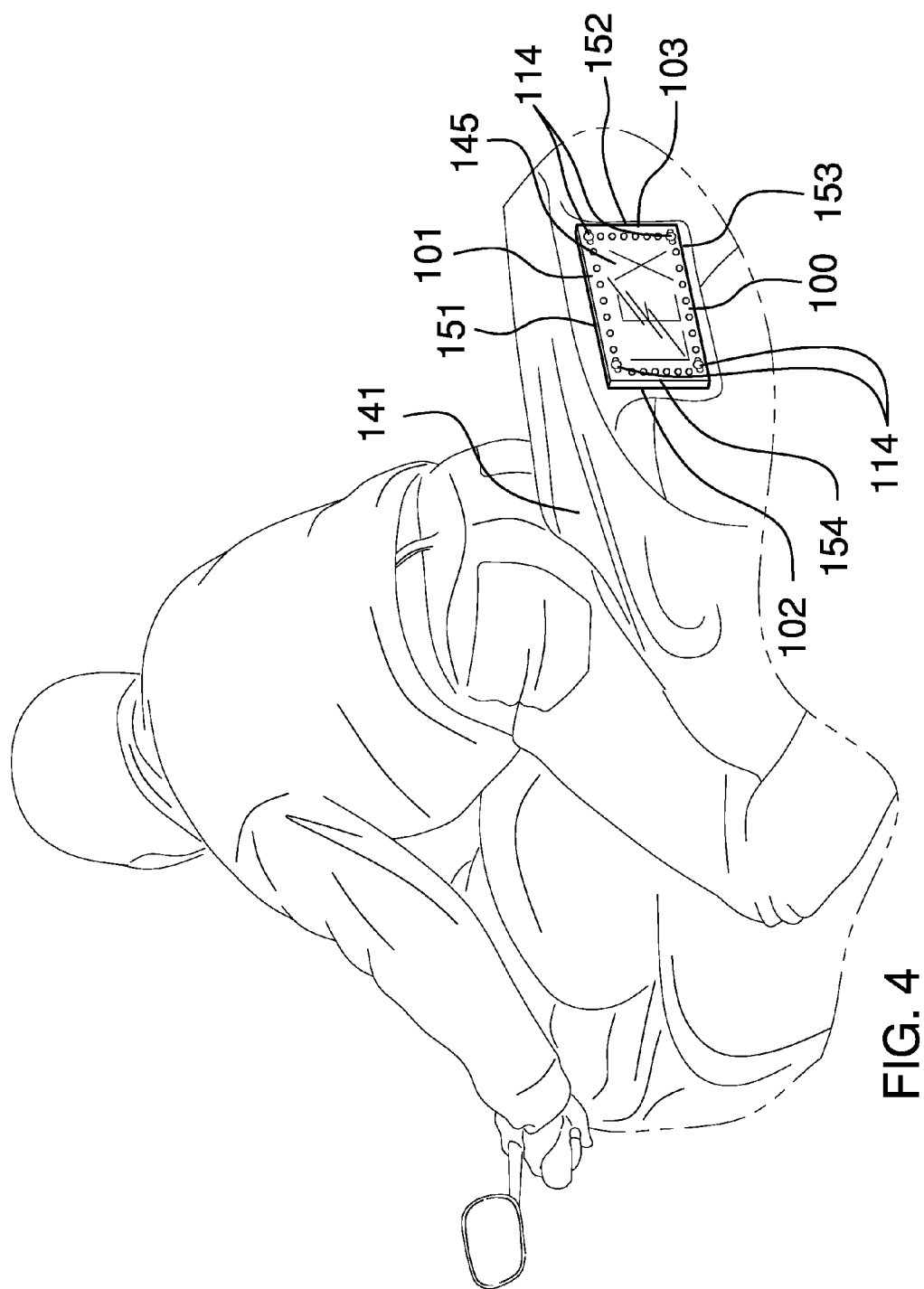
FIG. 4 is an in use view of an embodiment of the disclosure.
Figure 5:
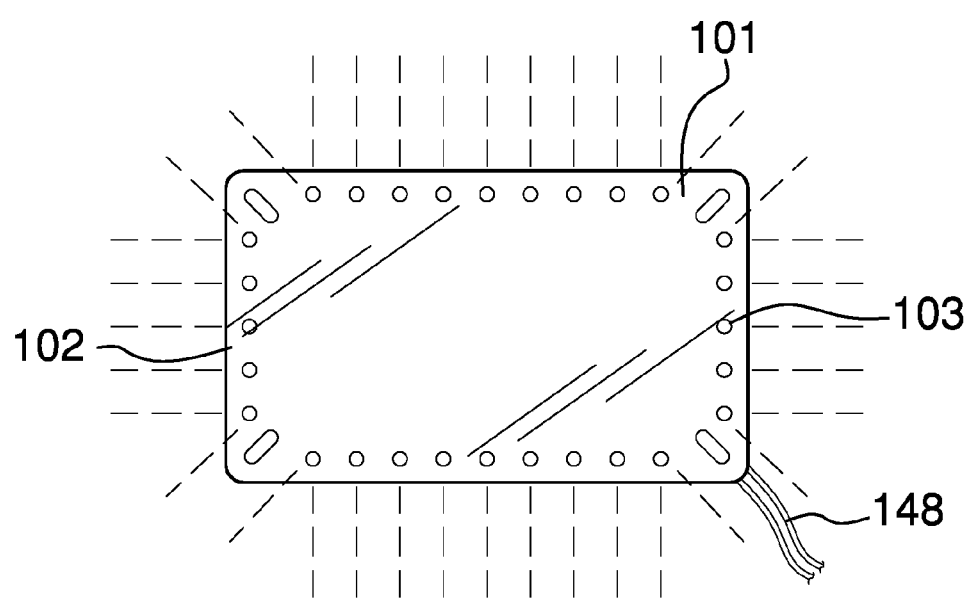
FIG. 5 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The illuminated license plate frame 100 (hereinafter invention) comprises a frame 101, a first LED string 102, a second LED string 103, a plurality of protective covers 104, and an electric circuit 105.

The frame 101 further comprises a base 111, a top mount 112, a cover slot 113, and a plurality of bolts 114. The base 111 is a rectangular structure upon which the license plate 145 is placed. The base 111 protects the vehicle 141 from damage caused by the license plate 145. The base 111 is further defined by a length 146 and a width 147. The span of the length 146 is greater than the span of the width 147. The top mount 112 is a structure that mounts along the perimeter of the base 111. The top mount 112 is formed with an open center that allows the license plate 145 to be seen through the top mount 112. The length 146 and width 147 of the top mount 112 corresponds to the length 146 and width 147 of the base 111. The top mount 112 is formed such that a cover slot 113 formed between the top mount 112 and the base 111. The cover slot 113 is an aperture positioned on the invention 100 such that when the invention 100 is properly mounted on the vehicle 141 the aperture is accessible from the side of the invention 100 that is distal from the surface upon which the vehicle 141 sits. The cover slot 113 is sized to receive one of the plurality of protective covers 104. The plurality of protective covers 104 is discussed elsewhere in this disclosure.

In the course of normal installation, the license plate 145 is placed over the base 111 and the top mount 112 is placed over the license plate 145. The base 111, top mount 112, and license plate 145 is then bolted to the vehicle 141 using the plurality of bolts 114. The specific positioning of the bolt holes on the base 111, top mount 112 and license plate 145 is standardized for most vehicles 141 in this countries. The invention 100 is further defined with a top side 151, a right side 152, a bottom side 153 and a left side 154. When properly installed, the cover slot 113 is on the top side 151 of the invention 100. When facing the license plate 145 of the installed invention 100, the location of the remaining sides in clockwise order are the right side 152, the bottom side 153, and the left side 154.

The first LED string 102 is a readily and commercially available LED strip (also referred to as an LED light tape) that is mounted in the top mount 112 such that the LEDs contained within the first LED string 102 are visible when the first LED string 102 is illuminated. The first LED string 102 is mounted on the left half of the top side 151, the left side 154 and the left half of the bottom side 153 of the top mount 112. The first LED string 102 is wired into the vehicle's 141 electrical system 148 such that the first LED string 102 will illuminate when: 1) the left turn 142 signal of the vehicle 141 is illuminated; or, 2) the brake light 144 of the vehicle 141 is illuminated. The electrical wiring of the first LED string 102 into the vehicle's 141 electrical system is discussed elsewhere in this disclosure.

The second LED string 103 is a readily and commercially available LED strip (also referred to as an LED light tape) that is mounted in the top mount 112 such that the LEDs contained within the second LED string 103 are visible when the second LED string 103 is illuminated. The second LED string 103 is mounted on the right half of the top side 151, the right side 152 and the right half of the bottom side 153 of the top mount 112. The second LED string 103 is wired into the vehicle's 141 electrical system 148 such that the second LED string 103 will illuminate when: 1) the right turn 143 signal of the vehicle 141 is illuminated; or, 2) the brake light 144 of the vehicle 141 is illuminated. The electrical wiring of the second LED string 103 into the vehicle's 141 electrical system is discussed elsewhere in this disclosure.

Each of the plurality of protective covers 104 is a transparent protective cover that is inserted through the cover slot 113 to cover the license plate 145. Each of the plurality of protective covers 104 protects the license plate 145 and the registration stickers placed on the license plate 145 from the elements. The plurality of protective covers 104 further comprises a clear cover 121, a tinted cover 122, and a magnifying cover 123. The clear cover 121 is a simple transparent plastic sheet. The tinted cover 122 is a transparent plastic sheet that has been darkened with a tinting film or through an additive contained with the plastic used to form the plastic sheet. The magnifying cover 123 is a transparent plastic sheet that is formed in the shape of a magnifying lens to increase the size of the displayed content of the license plate 145.

Figure 6:
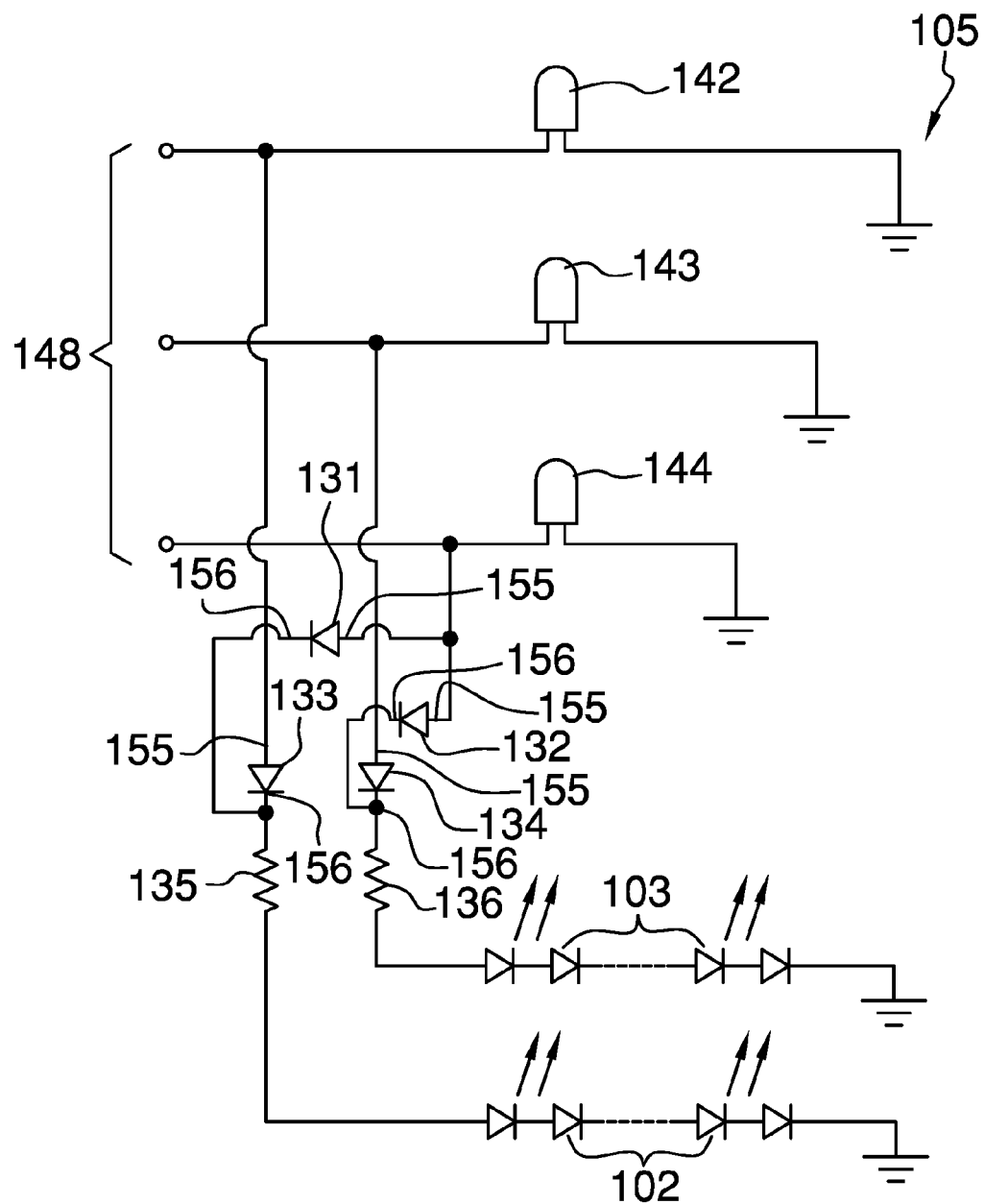
FIG. 6 is a schematic view of an embodiment of the disclosure.

The electric circuit 105 controls the operation of the first LED string 102 and the second LED string 103. The electric circuit 105 further comprises a first diode 131, a second diode 132, a third diode 133, a fourth diode 134, a first limit resistor 135 and a second limit resistor 136. As shown in FIG. 6, the electric circuit 105 works as follows. The anode 155 of the third diode 133 is connected directly to the voltage source that is used to power the left turn signal 142. The first limit resistor 135 is placed in series between the cathode 156 of the third diode 133 and the first LED string 102. When a voltage is applied to illuminate the left turn signal 142 an electric current flows through the third diode 133 and the first limit resistor 135 into the first LED string 102 illuminating the first LED string 102. The first limit resistor 135 limits current flow through the first LED string 102. The third diode 133 isolates the brake light 144 voltage source from the left turn signal 142 voltage source. The anode 155 of the fourth diode 134 is connected directly to the voltage source that is used to power the right turn signal 143. The second limit resistor 136 is placed in series between the cathode 156 of the fourth diode 134 and the second LED string 103.

When a voltage is applies to illuminate the right turn signal 143 an electric current flows through the fourth diode 134 and the second limit resistor 136 into the second LED string 103 illuminating the second LED string 103. The second limit resistor 136 limits current flow through the second LED string 103. The fourth diode 134 isolates the brake light 144 voltage source from the right turn signal 143 voltage source. The anode 155 of the first diode 131 is connected directly to the voltage source that is used to power the brake lights 144. The cathode 156 of the first diode 131 is connected between the cathode 156 of the third diode 133 and the first limit resistor 135.

When a voltage is applied to illuminate the brake light 144 an electric current flows through the first diode 131 and the first limit resistor 135 into the first LED string 102 illuminating the first LED string 102. The first diode 131 isolates the left turn signal 142 voltage source from the brake light 144 voltage source. The anode 155 of the second diode 132 is connected directly to the voltage source that is used to power the brake lights 144.

The cathode 156 of the second diode 132 is connected between the cathode 156 of the fourth diode 134 and the second limit resistor 136. When a voltage is applied to illuminate the brake light 144 an electric current flows through the second diode 132 and the second limit resistor 136 into the second LED string 103 illuminating the second LED string 103. The second diode 132 isolates the right turn signal 143 voltage source from the brake light 144 voltage source.

The frame 101 is formed from sheet metal. Methods to form frames from sheet metal are well known and documented in the art. The first LED string 102 and the second LED 103 string are commercially available. Methods to mount LED strips on frames and other structures are well known and documented in the art. Each of the plurality of protective covers 104 is formed from poly(methyl methacrylic). The components discussed in the electric circuit 105 are readily and commercially available.

The following definitions were used in this disclosure:

LED: As used in this disclosure, an LED is an acronym for a light emitting diode. A light emitting diode is a 2 lead semiconductor that is also a light source.

Perimeter: As used in this disclosure, a perimeter is one or more curved or straight lines that bounds an enclosed area on a plane.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A license plate frame comprising:
a frame, a first LED string, a second LED string, a plurality of protective covers, and an electric circuit;
wherein the license plate frame is adapted for use with license plates;

wherein the license plate frame attaches a license plate to a vehicle;

wherein the license plate frame is illuminated by the first LED string and the second LED string;

wherein the first LED string and the second LED string are illuminated by the electric circuit;

wherein the electric circuit is connected to the electrical system of the vehicle;

wherein when an illuminated left turn signal of the vehicle is illuminated the first LED string is illuminated;

wherein when an illuminated right turn signal of the vehicle is illuminated the second LED string is illuminated;

wherein when an illuminated brake signal of the vehicle is illuminated the first LED string is illuminated;

wherein when an illuminated brake signal of the vehicle is illuminated the second LED string is illuminated;

wherein the license plate frame further comprises a left side, a top side, a right side, and a bottom side.

2. The license plate frame according to claim 1 wherein the frame further comprises a base, a top mount, a cover slot, and a plurality of bolts.

3. The license plate frame according to claim 2 wherein the base is a rectangular structure upon which the license plate is placed.

4. The license plate frame according to claim 3 wherein the top mount is a structure that mounts along the perimeter of the base.

5. The license plate frame according to claim 4 wherein the top mount is formed with an open center.

6. The license plate frame according to claim 5 wherein the top mount is formed such that a cover slot formed between the top mount and the base.

7. The license plate frame according to claim 6 wherein the cover slot is sized to receive a protective cover selected from the plurality of protective covers.

8. The license plate frame according to claim 7 wherein the first LED string is mounted on the left half of the top side, the left side and the left half of the bottom side of the top mount;

wherein the second LED string is mounted on the right half of the top side, the right side and the right half of the bottom side of the top mount.

9. The license plate frame according to claim 8 wherein each of the plurality of protective covers is a transparent protective cover that is inserted through the cover slot to cover the license plate.

10. The license plate frame according to claim 9 wherein the plurality of protective covers further comprises a clear cover and a tinted cover.

11. The license plate frame according to claim 10 wherein the plurality of protective covers further comprises a magnifying cover.

12. The license plate frame according to claim 8 wherein the electric circuit further comprises a first diode, a second diode, a third diode, a fourth diode, a first limit resistor and a second limit resistor.

13. The license plate frame according to claim 12 wherein the anode of the third diode is connected directly to the voltage source that is used to power the left turn signal;

wherein the first limit resistor is placed in series between the cathode of the third diode and the first LED string;

wherein the anode of the fourth diode is connected directly to the voltage source that is used to power the right turn signal;

wherein the second limit resistor is placed in series between the cathode of the fourth diode and the second LED string;

wherein the anode of the first diode is connected directly to the voltage source that is used to power the brake lights;

wherein the cathode of the first diode is connected between the cathode of the third diode and the first limit resistor;

wherein the anode of the second diode is connected directly to the voltage source that is used to power the brake lights;

wherein the cathode of the second diode is connected between the cathode of the fourth diode and the second limit resistor;

wherein the first LED string is connected to the ground of the vehicle's electrical system;

wherein the first LED string is connected to the ground of the vehicle's electrical system.

14. The license plate frame according to claim 1 wherein the first LED string is mounted on the left half of the top side, the left side and the left half of the bottom side of the top mount;

wherein the second LED string is mounted on the right half of the top side, the right side and the right half of the bottom side of the top mount.

15. The license plate frame according to claim 14 wherein the electric circuit further comprises a first diode, a second diode, a third diode, a fourth diode, a first limit resistor and a second limit resistor.

16. The license plate frame according to claim 15 wherein the anode of the third diode is connected directly to the voltage source that is used to power the left turn signal;

wherein the first limit resistor is placed in series between the cathode of the third diode and the first LED string;

wherein the anode of the fourth diode is connected directly to the voltage source that is used to power the right turn signal;

wherein the second limit resistor is placed in series between the cathode of the fourth diode and the second LED string;

wherein the anode of the first diode is connected directly to the voltage source that is used to power the brake lights;

wherein the cathode of the first diode is connected between the cathode of the third diode and the first limit resistor;

wherein the anode of the second diode is connected directly to the voltage source that is used to power the brake lights;

wherein the cathode of the second diode is connected between the cathode of the fourth diode and the second limit resistor;

wherein the first LED string is connected to the ground of the vehicle's electrical system;

wherein the first LED string is connected to the ground of the vehicle's electrical system.

17. The license plate frame according to claim 16 wherein the frame further comprises a base, a top mount, a cover slot, and a plurality of bolts.

18. The license plate frame according to claim 17 wherein the top mount is a structure that mounts along the perimeter of the base;

wherein the top mount is formed with an open center.

19. The license plate frame according to claim 18 wherein the top mount is formed such that a cover slot formed between the top mount and the base.

20. The license plate frame according to claim 19 wherein the cover slot is sized to receive a protective cover selected from the plurality of protective covers.

* * * * *